United States Patent
Baccouche et al.

(10) Patent No.: US 11,097,779 B2
(45) Date of Patent: Aug. 24, 2021

(54) SLIDABLE TRUSS ASSEMBLY FOR A VEHICLE

(71) Applicant: Ford Global Technologies, LLC, Dearborn, MI (US)

(72) Inventors: Mohamed Ridha Baccouche, Ann Arbor, MI (US); Saied Nusier, Canton, MI (US); Saeed David Barbat, Novi, MI (US); Rahul Arora, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 186 days.

(21) Appl. No.: 16/658,689

(22) Filed: Oct. 21, 2019

(65) Prior Publication Data

US 2021/0114664 A1    Apr. 22, 2021

(51) Int. Cl.
*B62D 21/15* (2006.01)
*B62D 27/02* (2006.01)

(52) U.S. Cl.
CPC ........... *B62D 21/152* (2013.01); *B62D 27/02* (2013.01)

(58) Field of Classification Search
CPC ...... B62D 21/15; B62D 21/152; B62D 27/00; B62D 27/02
See application file for complete search history.

(56) References Cited

U.S. PATENT DOCUMENTS

| | | | |
|---|---|---|---|
| 7,926,847 B2 | 4/2011 | Auer et al. | |
| 8,888,168 B2 * | 11/2014 | Kuwabara | B62D 25/082 296/187.09 |
| 8,985,258 B1 * | 3/2015 | Midoun | B62D 25/082 180/274 |
| 8,985,671 B1 * | 3/2015 | Lei | B60R 19/18 296/133 |
| 8,991,903 B1 * | 3/2015 | Alavandi | B60R 19/26 296/187.09 |
| 9,027,695 B2 * | 5/2015 | Nakamura | B62D 21/155 180/247 |
| 9,067,549 B2 * | 6/2015 | Baccouche | B60R 19/14 |
| 9,126,550 B2 | 9/2015 | Nusier et al. | |
| 9,421,865 B2 * | 8/2016 | Bernardi | B60K 28/14 |
| 9,421,927 B2 * | 8/2016 | Basappa | B62D 21/152 |
| 9,550,462 B2 | 1/2017 | Ramoutar et al. | |
| 9,550,463 B2 | 1/2017 | Hara et al. | |
| 9,908,560 B2 | 3/2018 | Nusier et al. | |
| 2001/0030450 A1 * | 10/2001 | Miyasaka | B62D 29/008 296/204 |
| 2019/0176896 A1 * | 6/2019 | Anegawa | B62D 25/16 |
| 2021/0078637 A1 * | 3/2021 | Hammer | B62D 21/03 |

* cited by examiner

*Primary Examiner* — Lori L Lyjak
(74) *Attorney, Agent, or Firm* — David Coppiellie, Esq.; Carlson, Gaskey & Olds, P.C.

(57) ABSTRACT

A vehicle frame assembly includes, among other things, a main rail of a vehicle and a truss assembly. The truss assembly includes a forward mounting member directly coupled to the main rail, a rear mounting member, a frame assembly connected to the forward mounting member and the rear mounting member, and an attachment that directly couples the rear mounting member to the main rail. The attachment is configured to shear when a load that exceeds a threshold load is applied to a front of the vehicle. The shearing of the attachment permits the rear mounting member to slide relative to the main rail.

19 Claims, 3 Drawing Sheets

SLIDABLE TRUSS ASSEMBLY FOR A VEHICLE

TECHNICAL FIELD

This disclosure relates generally to body structures of a vehicle and, more particularly, to a slidable truss assembly that can laterally deflect loads during a frontal impact.

BACKGROUND

Vehicles designs can undergo many tests. One such test, the Small Offset Rigid Barrier (SORB) test, simulates small offset frontal collisions against a rigid barrier. During the SORB test, an impact load is applied to a front of the vehicle at a position outboard of one of the main rails.

SUMMARY

A vehicle frame assembly according to an exemplary aspect of the present disclosure includes, among other things, a main rail of a vehicle and a truss assembly. The truss assembly includes a forward mounting member directly coupled to the main rail, a rear mounting member, a frame assembly connected to the forward mounting member and the rear mounting member, and an attachment that directly couples the rear mounting member to the main rail. The attachment is configured to shear when a load that exceeds a threshold load is applied to a front of the vehicle. The shearing of the attachment permits the rear mounting member to slide relative to the main rail.

In a further embodiment of the foregoing vehicle frame assembly, the at least one attachment comprises at least one weld that is severed in response to the threshold load.

In a further embodiment of any of the foregoing vehicle frame assemblies the attachment directly couples the rear mounting member to an outboard surface of the main rail.

A further embodiment of any of the foregoing vehicle frame assemblies includes mechanical fasteners that directly couple the forward mounting member to the main rail.

In a further embodiment of any of the foregoing vehicle frame assemblies, the forward mounting member includes a horizontally extending flange directly coupled to a top surface of the main rail and a vertically extending flange directly coupled to an outboard surface of the main rail.

In a further embodiment of any of the foregoing vehicle frame assemblies, the rear mounting member includes an upper horizontally extending flange disposed adjacent a top surface of the main rail, a vertically extending flange disposed adjacent an outboard surface of the main rail, and a lower horizontally extending flange disposed adjacent a bottom surface of the main rail.

In a further embodiment of any of the foregoing vehicle frame assemblies, the forward mounting member is spaced a distance along the frame member from the rear mounting member.

In a further embodiment of any of the foregoing vehicle frame assemblies, the rear mounting member is configured to slide in response to the load from a first position where the rear mounting member is spaced a first distance from the forward mounting member to a second position where the rear mounting member is spaced a greater, second distance from the forward mounting member.

In a further embodiment of any of the foregoing vehicle frame assemblies, the load is applied to the vehicle at a position outboard the main rail.

In a further embodiment of any of the foregoing vehicle frame assemblies, the frame assembly includes a forward beam member extending laterally outward from the forward mounting member to an apex of the truss, and a rear beam member extending laterally outward from the rear mounting member to the apex of the truss.

In a further embodiment of any of the foregoing vehicle frame assemblies, the frame assembly further includes a first support beam member extending laterally outward from the rear mounting member to the forward beam member, and a second support beam member extending laterally outward from the rear mounting member to the rear beam member.

In a further embodiment of any of the foregoing vehicle frame assemblies, the forward beam member is an upper forward beam member. The assembly further includes a lower forward beam member extending laterally outward from the forward mounting member to the apex of the truss. The rear beam member is an upper rear beam member. The assembly further includes a lower rear beam member extending laterally outward from the rear mounting member to the apex of the truss.

In a further embodiment of any of the foregoing vehicle frame assemblies, the apex is forward a wheel well area of the vehicle.

A vehicle frame assembly according to another exemplary aspect of the present disclosure includes, among other things, a main rail of a vehicle and a truss assembly. The truss assembly includes a forward mounting member directly coupled to the main rail, a rear mounting member, a frame assembly connected to the forward mounting member and the rear mounting member, and at least an attachment that directly couples the rear mounting member to an outboard side of the main rail, and shears when a load that exceeds a threshold load is applied to a front of the vehicle outboard the main rail. The shearing of the attachment permits the rear mounting member to slide relative to the main rail. The rear mounting member is configured to slide in response to the load from a first position where the rear mounting member is spaced a first distance from the forward mounting member to a second position where the rear mounting member is spaced a greater, second distance from the forward mounting member.

In a further embodiment of any of the foregoing vehicle frame assemblies, the frame assembly includes a forward beam member extending laterally outward from the forward mounting member to an apex of the truss, and a rear beam member extending laterally outward from the rear mounting member to the apex of the truss. The frame assembly further includes a first support beam member extending laterally outward from the rear mounting member to the forward beam member, and a second support beam member extending laterally outward from the rear mounting member to the rear beam member.

A vehicle frame load absorbing method according to yet another exemplary aspect of the present disclosure includes, among other things, providing a truss assembly having a forward mounting member directly coupled to a main rail, a rear mounting member directly coupled to the main rail, and a frame assembly connected to the forward mounting member and the rear mounting member. The method further includes applying a load that exceeds a threshold load to a front of the vehicle, shearing an attachment that directly couples the rear mounting member to the main rail in response to the load, and after the shearing, sliding the rear mounting member relative to the main rail to absorb the load.

Another example of the foregoing method includes, after the shearing, sliding the rear mounting member relative to the forward mounting member.

In another example of any of the foregoing methods, the attachment that directly couples the rear mounting member to the main rail is a weld.

Another example of any of the foregoing methods includes applying the load at a position outboard the main rail.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a vehicle frame having a slidable truss assembly that can absorb impact kinetic energy when a frontal impact load is applied to a vehicle, particularly a load applied outboard a main rail of the vehicle frame. The slidable truss assembly can facilitate absorbing and redirect loads during, for example, a Small Offset Rigid Barrier (SORB) test.

Figure 1:
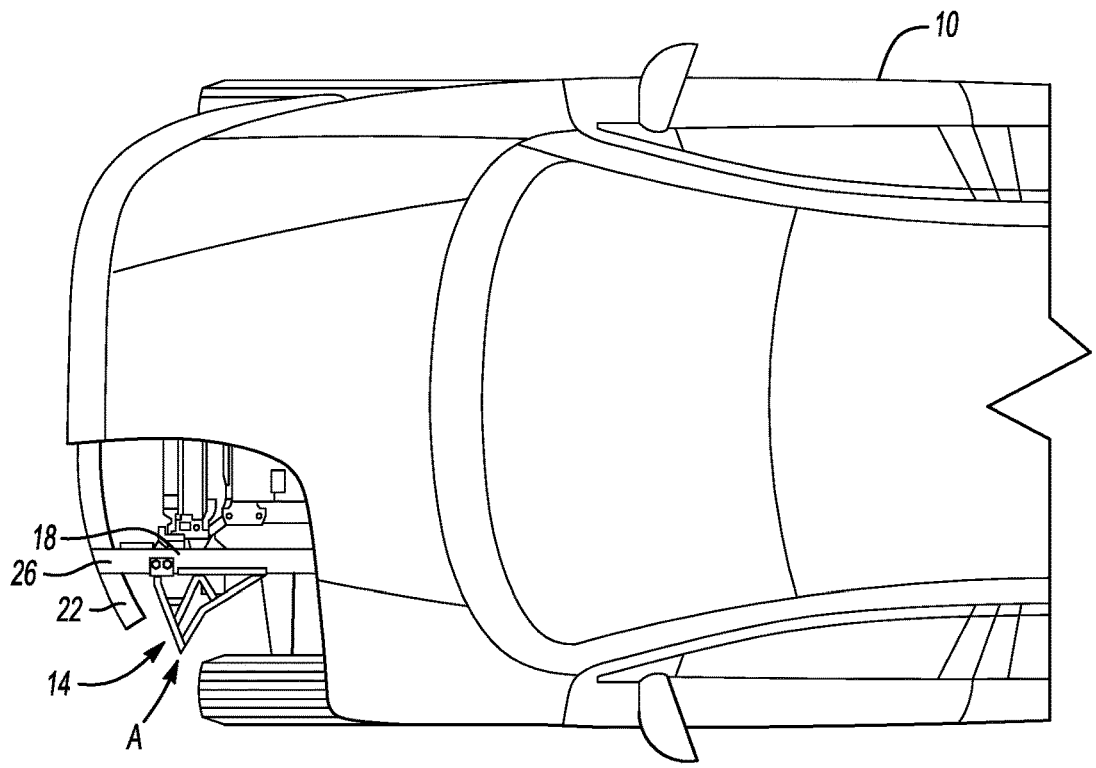
FIG. 1 is a top, partially section view of a vehicle illustrating a slidable truss assembly according to an exemplary aspect of the present disclosure.

With reference to FIG. 1, a vehicle 10 includes a slidable truss assembly 14 disposed on a laterally outboard side of a main rail 18 of the vehicle 10. The slidable truss assembly 14 is on a driver side of the vehicle 10. Another slidable truss assembly (not shown), is disposed on a passenger side of the vehicle 10 laterally outside another main rail.

A bumper 22 of the vehicle 10 extends laterally across the vehicle 10 and partially outboard of the main rail 18. A crush can 26 is disposed between the bumper 22 and the main rail 18. The crush can 26 can help to absorb loads applied to a front of the vehicle 10 through the bumper 22.

The SORB test replicates the vehicle 10 impacting with a rigid barrier that is outboard the main rail 18. During the SORB test, the crush can 26 can absorb some load. However, in the exemplary embodiment, the slidable truss assembly 14 is also utilized to absorb and redirect the load and to minimize intrusion of the rigid barrier into the vehicle 10. The slidable truss assembly 14 can redirect the applied during the SORB test to the main rail 18 while additionally helping to slide or push the vehicle 10 away from the rigid barrier.

Figure 2:
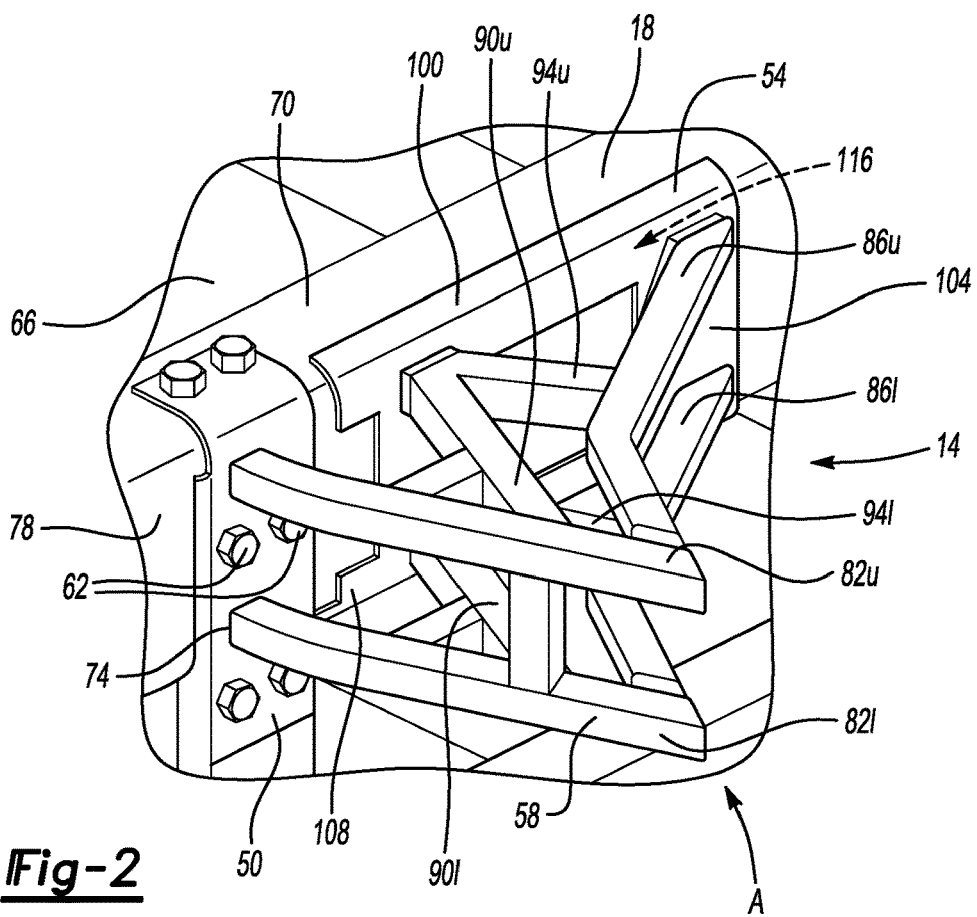
FIG. 2 illustrates a perspective view of the slidable truss assembly of FIG. 1.
Figure 3:
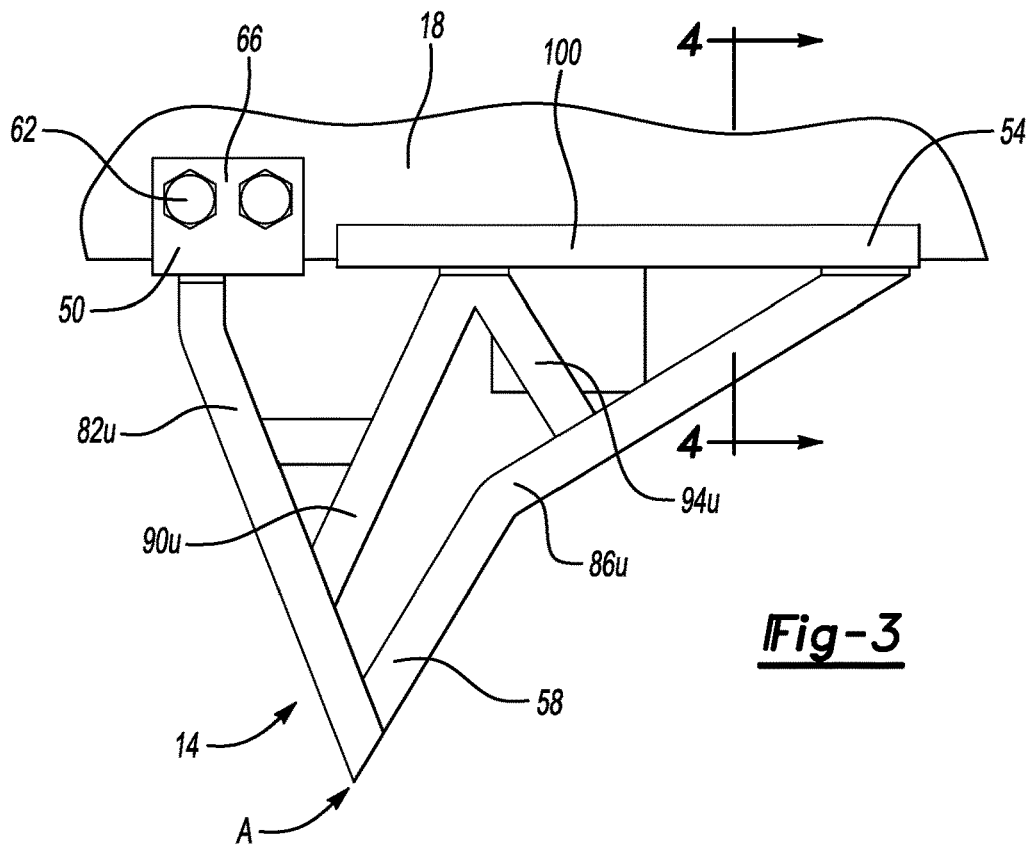
FIG. 3 illustrates a top view of the slidable truss assembly of FIG. 1.
Figure 4:
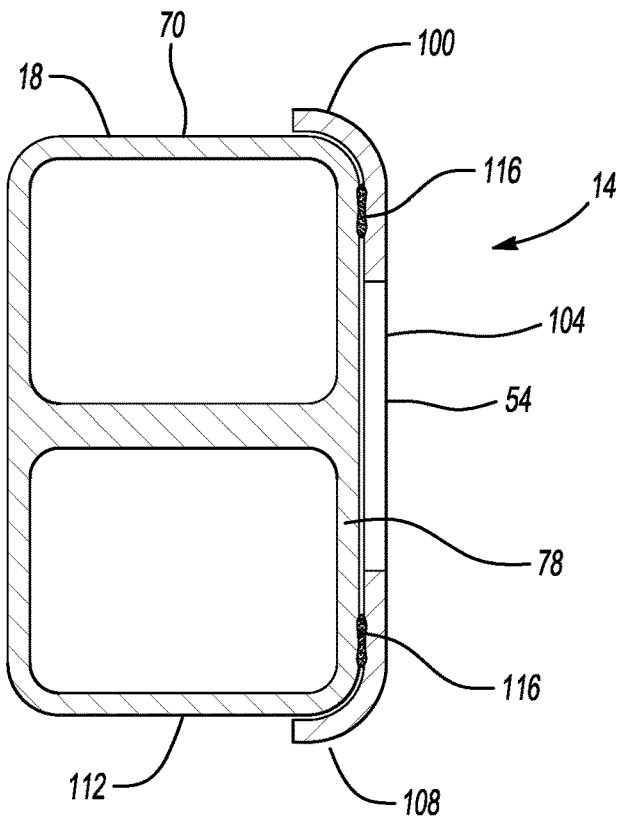
FIG. 4 illustrates a section view taken at line 4-4 in FIG. 3.

With reference now to FIGS. 2-4, the slidable truss assembly 14 in the exemplary embodiment includes, among other things, a forward mounting member 50, a rear mounting member 54, and a frame assembly 58. The forward mounting member 50 is directly coupled to the main rail 18. In this example, the forward mounting member 50 is directly coupled to the main rail 18 via a plurality of mechanical fasteners, here bolts 62.

The forward mounting member 50 includes a horizontally extending flange 66 that is directly coupled to a top surface of the main rail 18 via some of the bolts 62. The forward mounting member 50 further includes a vertically extending flange 74 that is directly coupled to an outboard surface 78 of the main rail 18 via other bolts 62.

The frame assembly 58 is directly connected to both the forward mounting member 50 and the rear mounting member 54.

In the exemplary embodiment, the frame assembly 58 includes an upper forward beam member 82u, a lower forward beam member 82l, an upper rear beam member 86u, and a lower rear beam member 86l. The upper and lower forward beam members 82u, 82l extend laterally outward from the forward mounting member 50 to an apex A of the frame assembly 58. As the upper and lower forward beam members 82u, 82l extend laterally outward, the upper and lower beam members 82u, 82l also taper rearward.

The upper and lower rear beam members 86u, 86l extend laterally outward from the rear mounting member 54 to the apex A. The upper and lower rear beam members 86u, 86l taper forward as the upper and lower rear beam members 86u, 86l extend toward the apex A. The apex A is forward a wheel well area of the vehicle 10 (FIG. 1).

The frame assembly 58 further includes upper and lower first support beam members 90u, 90l that extend laterally outward from the rear mounting member 54 to the respective forward beam members 82u, 82l. Additionally, the frame assembly includes upper and lower second support beam members 94u, 94l that extend laterally outward from the rear mounting member 54 to the respective upper or lower rear beam member 86u or 86l.

The upper first support beam member 90u and the upper second support beam member 94u interface with the rear mounting member 54 at the same position. The lower first support beam member 90l and the lower second support beam member 94l interface with the mounting member 54 at the same position.

The rear mounting member 54 includes an upper horizontally extending flange 100, a vertically extending flange 104, and a lower horizontally extending flange 108. The upper horizontally extending flange 100 is disposed adjacent the top surface 70 of the main rail 18. The vertically extending flange 104 is disposed adjacent the laterally outboard surface 78 of the main rail 18. The lower horizontally extending flange 108 is disposed adjacent a bottom surface 112 of the main rail 18.

The rear mounting member 54 is secured, in this embodiment, to the main rail 18 via at least one attachment 116. In the exemplary embodiment, the at least one attachment 116 is a plurality of spot welds. Other types of attachments could be used in other examples. The at least one attachment 116 could instead be one or more mechanical fasteners, for example.

The at least one attachment 116 is configured to shear when a load above a threshold load is applied to a front of the vehicle 10 outboard the main rail 18. An example of such a load is a load applied during the SORB test.

When such the load is applied, the at least one attachment 116 shears such that the rear mounting member 54 is no longer directly attached to the main rail 18. Shearing the at least one attachment 116 permits movement of the rear mounting member 54 relative to the forward mounting member 50.

As the load on the vehicle continues, the frame assembly 58 deforms and the rear mounting member 54 slides along the main rail 18. Forces are directed from the rear mounting member 54 into the main rail 18. This can help to reduce a peak load applied to the vehicle 10 and minimize intrusion into the vehicle 10 by lengthening a time that the load is applied.

Prior to shearing, the at least one attachment 116 stabilizes the rear mounting member 54 relative to the main rail 18. The at least one attachment 116, for example, helps to prevent vibration of the rear mounting member 54 during operation of the vehicle 10. However, other mechanisms for limiting such vibration may be applied.

Configuring the at least one attachment 116 to shear in response to a load exceeding a threshold load can be accomplished by, for example, changing a size of the least one attachment 116 or adding or removing attachment locations. If mechanical fasteners are used, a diameter of the mechanical fasteners could be increased or decreased to adjust a load at which the mechanical fasteners shear. A person having skill in the art and the benefit of this disclosure could adjust attachments to provide at least one fastener that shears at a desired threshold load.

The rear mounting member 54 has a cupped or C-shaped configuration that helps to maintain positioning of the rear mounting member 54 relative to the main rail 18 even after shearing of the at least one attachment 116, and especially vertical positioning. If a load is applied that drives the rear mounting member 54 vertically upward, the horizontally extending flange 118 can contact the bottom surface 112 to limit vertical displacement of the rear mounting member 54 relative to the main rail 18.

Figure 5:
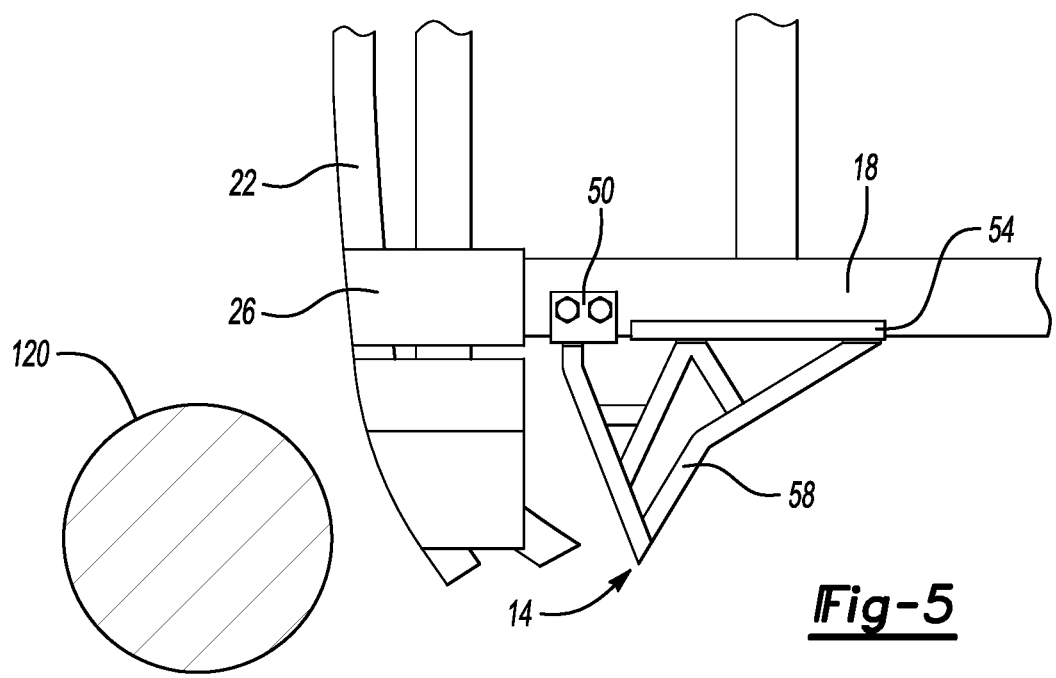
FIG. 5 illustrates the slidable truss assembly at the start of an exemplary test.
Figure 6:
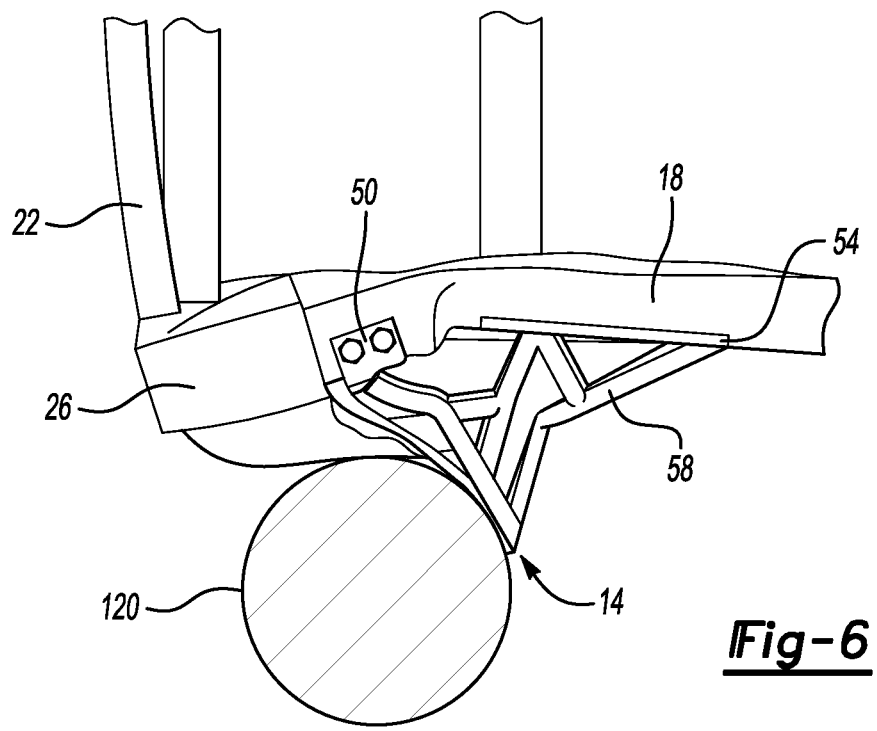
FIG. 6 illustrates the view of FIG. 5 after starting the test and contacting the vehicle against a rigid barrier.

With reference now to FIGS. 5 and 6, a rigid barrier 120 can be utilized in connection with a SORB test. As the rigid barrier 120 and the front area of the vehicle 10 are moved relatively toward each other, the rigid barrier 120 contacts the bumper 22 and can at least partially collapse the crush can 26.

Further relative movement begins to deform the frame assembly 58 to the position of FIG. 6 and shears the at least one attachment 116. In FIG. 6, the at least one attachment 116 has sheared permitting the rear mounting member 54 to slide rearward relative to the main rail 18 from the position of FIG. 5 to the position of FIG. 6.

As shown, the forward mounting member 50 and the rear mounting member 54 are spaced a distance apart in FIG. 5 that is less than the distance between the forward mounting member 50 and the rear mounting member 54 shown in FIG. 6.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle frame assembly, comprising:
   a main rail of a vehicle;
   a truss assembly including:
      a forward mounting member directly coupled to the main rail;
      a rear mounting member;
      a frame assembly connected to the forward mounting member and the rear mounting member; and
      at least one attachment that directly couples the rear mounting member to the main rail, wherein the at least one attachment is configured to shear when a load that exceeds a threshold load is applied to a front of the vehicle, the shearing of the at least one attachment permitting the rear mounting member to slide relative to the main rail.

2. The vehicle frame assembly of claim 1, wherein the at least one attachment comprises at least one weld that is severed in response to the threshold load.

3. The vehicle frame assembly of claim 1, wherein at least one attachment directly couples the rear mounting member to an outboard surface of the main rail.

4. The vehicle frame assembly of claim 1, further comprising a plurality of mechanical fasteners that directly couple the forward mounting member to the main rail.

5. The vehicle frame assembly of claim 1, wherein the forward mounting member includes a horizontally extending flange directly coupled to a top surface of the main rail and a vertically extending flange directly coupled to an outboard surface of the main rail.

6. The vehicle frame assembly of claim 1, wherein the rear mounting member includes an upper horizontally extending flange disposed adjacent a top surface of the main rail, a vertically extending flange disposed adjacent an outboard surface of the main rail, and a lower horizontally extending flange disposed adjacent a bottom surface of the main rail.

7. The vehicle frame assembly of claim 1, wherein the forward mounting member is spaced a distance along the frame member from the rear mounting member.

8. The vehicle frame assembly of claim 1, wherein the rear mounting member is configured to slide in response to the load from a first position where the rear mounting member is spaced a first distance from the forward mounting member to a second position where the rear mounting member is spaced a greater, second distance from the forward mounting member.

9. The vehicle frame assembly of claim 1, wherein the load is applied to the vehicle at a position outboard the main rail.

10. The vehicle frame assembly of claim 1, wherein the frame assembly includes a forward beam member extending laterally outward from the forward mounting member to an apex of the truss, and a rear beam member extending laterally outward from the rear mounting member to the apex of the truss.

11. The vehicle frame assembly of claim 10, wherein the frame assembly further includes a first support beam member extending laterally outward from the rear mounting member to the forward beam member, and a second support beam member extending laterally outward from the rear mounting member to the rear beam member.

12. The vehicle frame assembly of claim 10, wherein the forward beam member is an upper forward beam member and further comprising a lower forward beam member extending laterally outward from the forward mounting member to the apex of the truss, wherein the rear beam member is an upper rear beam member and further comprising a lower rear beam member extending laterally outward from the rear mounting member to the apex of the truss.

13. The vehicle frame assembly of claim 10, wherein the apex is forward a wheel well area of the vehicle.

14. A vehicle frame assembly, comprising:
a main rail of a vehicle;
a truss assembly including:
  a forward mounting member directly coupled to the main rail;
  a rear mounting member;
  a frame assembly connected to the forward mounting member and the rear mounting member; and
  at least one attachment that directly couples the rear mounting member to an outboard side of the main rail, and shears when a load that exceeds a threshold load is applied to a front of the vehicle outboard the main rail, the shearing of the at least one attachment permitting the rear mounting member to slide relative to the main rail,
  wherein the rear mounting member is configured to slide in response to the load from a first position where the rear mounting member is spaced a first distance from the forward mounting member to a second position where the rear mounting member is spaced a greater, second distance from the forward mounting member.

15. The vehicle frame assembly of claim 14, wherein the frame assembly includes a forward beam member extending laterally outward from the forward mounting member to an apex of the truss, and a rear beam member extending laterally outward from the rear mounting member to the apex of the truss,
wherein the frame assembly further includes a first support beam member extending laterally outward from the rear mounting member to the forward beam member, and a second support beam member extending laterally outward from the rear mounting member to the rear beam member.

16. A vehicle frame load absorbing method, comprising:
providing a truss assembly having a forward mounting member directly coupled to a main rail, a rear mounting member directly coupled to the main rail, and a frame assembly connected to the forward mounting member and the rear mounting member;
applying a load that exceeds a threshold load to a front of the vehicle;
shearing an attachment that directly couples the rear mounting member to the main rail in response to the load; and
after the shearing, sliding the rear mounting member relative to the main rail to absorb the load.

17. The vehicle frame load absorbing method of claim 16, further comprising, after the shearing, sliding the rear mounting member relative to the forward mounting member.

18. The vehicle frame load absorbing method of claim 16, wherein the attachment that directly couples the rear mounting member to the main rail is a weld.

19. The vehicle frame load absorbing method of claim 16, further comprising applying the load at a position outboard the main rail.

* * * * *